United States Patent [19]

Carter

[11] Patent Number: 5,536,574
[45] Date of Patent: Jul. 16, 1996

[54] OXIDATION PROTECTION FOR CARBON/CARBON COMPOSITES

[75] Inventor: John A. Carter, Arlington, Tex.

[73] Assignee: Loral Vought Systems Corporation, Grand Prairie, Tex.

[21] Appl. No.: 412,264

[22] Filed: Mar. 28, 1995

Related U.S. Application Data

[62] Division of Ser. No. 101,451, Aug. 2, 1993.

[51] Int. Cl.$^6$ ........................................ D04H 1/08
[52] U.S. Cl. .................. 428/381; 428/367; 428/375; 428/378; 428/380; 428/408; 428/697; 428/704; 427/450; 427/452; 427/446; 427/590
[58] Field of Search ............................ 428/367, 378, 428/381, 375, 380, 384, 366, 387, 386, 389, 408, 501, 372, 446, 448, 698, 699, 689, 688, 704, 697, 701, 702; 501/95, 96; 427/450, 452, 585, 446, 430, 589, 590

[56] References Cited

U.S. PATENT DOCUMENTS

| | | | |
|---|---|---|---|
| 3,642,504 | 2/1972 | Petzold et al. | 106/39 DV |
| 4,465,777 | 8/1984 | Shuford | 501/88 |
| 4,471,023 | 9/1984 | Shuford | 428/408 |
| 4,500,602 | 2/1985 | Patten et al. | 428/408 |
| 4,559,270 | 12/1985 | Sara | 428/408 |
| 4,560,603 | 12/1985 | Giacomel | 428/86 |
| 4,585,675 | 4/1986 | Shuford | 427/376.2 |
| 4,610,896 | 9/1986 | Veltri et al. | 427/140 |
| 4,613,522 | 9/1986 | Vasilos | 427/202 |
| 4,659,624 | 4/1987 | Yeager et al. | 428/408 |
| 4,671,997 | 6/1987 | Galasso et al. | 428/408 |
| 4,711,666 | 12/1987 | Chapman et al. | 106/14.12 |
| 4,735,850 | 4/1988 | Eitman | 428/283 |
| 4,795,677 | 1/1989 | Gray | 428/246 |
| 4,830,919 | 5/1989 | Shuford | 428/408 |
| 4,840,763 | 6/1989 | Freitag | 264/65 |
| 4,892,790 | 1/1990 | Gray | 428/548 |
| 4,894,286 | 1/1990 | Gray | 428/408 |
| 4,931,413 | 6/1990 | Weir et al. | 501/31 |
| 5,225,283 | 7/1993 | Leung et al. | 428/408 |
| 5,324,541 | 6/1994 | Shuford | 427/376.2 |
| 5,326,595 | 7/1994 | Shuford | 427/376.2 |

OTHER PUBLICATIONS

Technical Data Bulletin No. M5, "Hi–Temp Graphite Adhesives/Coatings" by Aremco Products, Inc., Dec. 1988.

*Primary Examiner*—Patrick J. Ryan
*Assistant Examiner*—Merrick Dixon
*Attorney, Agent, or Firm*—Richards, Medlock & Andrews

[57] ABSTRACT

The oxidation protection for a surface of a carbon/carbon composite substrate having a primary protective coating previously formed thereon is improved by applying to said surface a layer of a coating material comprising titanium diboride, colloidal silica, and an intermetallic compound, e.g., silicon carbide. The primary coating can be a boronated silicon carbide coating.

16 Claims, No Drawings

OXIDATION PROTECTION FOR CARBON/CARBON COMPOSITES

RELATED APPLICATION

This is a division of my copending application Ser. No. 08/101,451, filed Aug. 2, 1993.

TECHNICAL FIELD OF THE INVENTION

The present invention relates to a method for reducing the occurrence of oxidation of carbon/carbon composite materials and to the thus protected carbon/carbon composite material. In a particular aspect, the invention relates to a method for forming a titanium diboride secondary coating on a carbon/carbon composite substrate having a silicon carbide/boron carbide primary protective coating formed thereon, and to the resulting carbon/carbon composite substrate having the primary and secondary coatings thereon.

BACKGROUND OF THE INVENTION

The use of carbon/carbon composite substrate materials is widespread in modern industry, particularly in the aerospace and aviation fields. However, it is well known that such carbon/carbon composite materials are relatively susceptible to oxidation at elevated temperatures. For this reason, it has been found desirable to provide these carbon/carbon composite materials with a primary protective coating in order to minimize the occurrence of oxidation of the carbon/carbon composite material at elevated temperatures.

Reinforced carbon/carbon materials, formed from graphite fabric impregnated with phenolic resin, have been provided with an oxidation resistant silicon carbide coating and used as the thermal protection system for the wing leading edge and nose cap surfaces of a Space Shuttle Orbiter. The oxidation resistant coating was formed by blending 60 wt % silicon carbide, 30 wt % silicon and 10 wt % alumina powders, and packing this mix around the carbon/carbon substrate in a graphite retort. Then the retort and its contents were heated to 3000° F. in an argon atmosphere. During the heating process, the outer layers of the carbon/carbon substrate were converted to silicon carbide. The silicon carbide coated substrates were then removed from the retort and cleaned.

Other examples of a primary protective coating for a carbonaceous substrate material are disclosed in U.S. Pat. Nos. 4,585,675 and 4,830,919 to Shuford. These Shuford patents disclose a protective coating for a carbonaceous substrate wherein the protective coating comprises about 40% to about 50% by weight silicon, about 30% to about 50% by weight silicon carbide, and about 20% to about 30% by weight alumina. U.S. patent application Ser. No. 638,045, filed Aug. 6, 1984 by Shuford, now U.S. Pat. No. 5,453,324, discloses a protective coating for a carbonaceous substrate wherein the protective coating is formed by first applying to the substrate a first mixture comprising particulate silicon, particulate silicon carbide, and particulate alumina, heat treating the substrate having the first mixture thereon, then applying to the thus treated substrate a second mixture of particulate silicon, particulate silicon carbide, and particulate boron, and then heat treating the substrate having the second mixture thereon.

Primary coatings of the type used in the Space Shuttle Orbiter and of the type disclosed by Shuford tend to have a high coefficient of expansion relative to the carbonaceous substrate to which they are applied. As a result of the disparity between the coefficients of expansion of the primary coating and the carbonaceous substrate, cracks in the primary coating tend to develop during cycles of heating and cooling, thereby exposing the carbonaceous substrate to oxygen.

Various efforts have been made to overcome the above referenced development of cracks in the primary protective coatings. For example, U.S. Pat. Nos. 4,585,675 and 4,830,919 to Shuford and U.S. patent application Ser. No. 06/638,045 by Shuford, now U.S. Pat. No. 5,453,324, disclose the use of an enhancement coating formed by impregnating the silicon carbide/boron carbide primary protective coating with tetraethyl orthosilicate. The tetraethyl orthosilicate enhancement coating can be heat cured at a temperature of approximately 3000° F. in order to form a silica coating on the carbonaceous substrate. Shuford further discloses the subsequent application of a mixture of a liquid alkali silicate and a silicon carbide powder over the tetraethyl orthosilicate enhancement coating.

Silicon sealants of the type disclosed by Shuford are typically molten at both low and high temperatures, thereby enabling them to flow into the cracks in the primary coating as such cracks develop. However, due to the fact that these silicon sealants are molten throughout a wide range of temperatures, they tend to be forced out of the cracks in the primary coating as the cracks close with increasing temperature. At least a portion of the silicon sealant thus forced from the cracks may be effectively removed from the surface of the coated carbon/carbon material during normal use, thereby precluding that portion of the silicon sealant from flowing back into cracks in the primary protective coating as such cracks reopen at lower temperatures. This effect is particularly prevalent when the carbon/carbon material is subjected to numerous heating and cooling cycles during which cracks in the primary coating repeatedly form and close.

Gray, U.S. Pat. No. 4,894,286, discloses incorporating a mixture of silicon, titanium, and boron metals into a carbon/carbon matrix in order to provide oxidation protection for the carbon/carbon matrix at high temperatures. In an example, a prepregging resin was prepared with 65 parts by weight of a phenolic resin, 10 parts by weight alcohol, and 35 parts by weight of a glass precursor powder. The glass precursor powder comprised 24.54 wt % $Ti_5Si_3$ (–325 mesh), 10.64 wt % SiC (–600 mesh), 24.67 wt % $SiB_6$ (–325 mesh), and 40.15 wt % B (sub-micron). The prepregging resin was incorporated into plies of thermally stabilized satin fabric, and the resulting laminate was laid up, cured, carbonized and densified. The thus prepared substrate was CVD coated with a silicon rich silicon carbide. The patentee concluded that two samples which had the SiSiC coatings exhibited no weight loss for 327 and 470 hours when subjected to a defined thermal test cycle, while a third sample exhibited a weight loss after an initial gain.

Weir et al, U.S. Pat. No. 4,931,413, disclose the use of a glass ceramic precursor composition to protect graphite, carbon, ceramic, and metals such as low carbon steel, from oxidation at elevated temperatures. The composition can comprise titanium diboride, a silica compound such as colloidal silica, and optionally an intermetallic compound such as silicon carbide, boron carbide and titanium carbide. A preferred composition is described as comprising 35 wt % titanium diboride, 40 wt % colloidal silica, and 25 wt % silicon carbide. The patentee indicated that for a coating composition, the particle size should be less than 80 mesh and preferably less than 200 mesh. The patentee also indicated that care had to be exercised in the firing cycle to prevent the coating from popping off the host material.

However, as the physical and chemical characteristics of various forms of carbon vary greatly, a material which may provide oxidation protection for one type of carbon will not necessarily provide the desired degree of protection for a different type of carbon. Similarly, a protective composition containing many of the same elements as another protective composition will not necessarily perform as effectively as the other protective composition for a particular carbon form substrate.

SUMMARY OF THE INVENTION

Accordingly, it is an objective of the present invention to provide a secondary glass ceramic coating for a carbon/carbon composite material having a primary protective coating which will substantially improve the oxidation protection for the carbon/carbon composite material.

The present invention is directed to a method for forming a secondary glass ceramic coating on a carbon/carbon composite material having a primary protective coating. In accordance with the method of the present invention, a secondary glass ceramic precursor coating material comprising titanium diboride and a silica compound is applied to a surface of the primary coated carbon/carbon composite material. The primary coated carbon/carbon composite material having the secondary coating material thereon is then subjected to heat treating at an elevated temperature which is sufficient to at least form the secondary coating material into a coherent coating which adheres to the primary coated carbon/carbon composite material. The primary coated carbon/carbon material having the coherent coating thereon is then cooled. During the heat treating step or a subsequent exposure to higher temperatures, the coherent coating undergoes at least partial melting so that upon cooling a crystalline glass ceramic coating is formed on the primary coated carbon/carbon composite material.

The present invention is further directed to a carbon/carbon composite material having a primary protective coating and a secondary glass ceramic coating applied thereto in order to reduce the rate of oxidation of the carbon/carbon composite material through cracks in the primary protective coating.

The presently preferred carbon/carbon composite substrate is formed by pyrolysis of a laminate of plies of graphite fabric impregnated with resin. The presently preferred primary protective coating is a boronated silicon carbide.

The secondary coating material comprises from about 35 to about 75 wt % titanium diboride, from about 10 to about 60 wt % of a silica compound, e.g. colloidal silica, and from about 0 to about 50 wt % of an intermetallic compound. The intermetallic compound can be selected from any material which, when reacted with oxygen, can supply one of the primary ions of silicon, titanium or boron, such as silicon carbide, boron carbide and titanium carbide. The presently preferred secondary coating material comprises about 35 wt % titanium diboride, about 40 wt % colloidal silica, and about 25 wt % silicon carbide.

DETAILED DESCRIPTION OF THE INVENTION

The present invention is directed to a method for forming a secondary glass ceramic coating on a carbon/carbon composite material having a primary protective coating, and to a composite material having a primary protective coating and a secondary glass ceramic coating thereon.

A carbon/carbon composite substrate can be prepared in any suitable manner, e.g., by laminating layers of carbon fabric with a phenolic resin, and then pyrolyzing the resin contained in the laminate. The steps of applying phenolic resin to the laminate and then subjected the laminate to pyrolysis can be repeated a plurality of times to densify the laminate.

The primary protective coating can be any suitable material for providing a primary coating on the carbon/carbon composite material which will provide substantial protection against the oxidation of the carbon/carbon composite material. The presently preferred primary protective coating is a silicon carbide coating, and the more preferred primary protective coating is a boronated silicon carbide coating. The silicon carbide coating can be applied and then boronated in any suitable manner.

A silicon carbide protective coating can be achieved by applying to the carbon/carbon composite material a mixture comprising silicon, silicon carbide, and alumina, and heat treating the substrate having the mixture thereon. The components of the mixture can be present in any suitable amount, but in general the amount of the silicon will be in the range of about 20 to about 60 weight percent of the mixture, the amount of silicon carbide will be in the range of about 20 to about 70 weight percent of the mixture, and the amount of the alumina will be in the range of about 5 to about 30 weight percent of the mixture. A presently preferred mixture comprises from about 25 to about 55 weight percent silicon, from about 25 to about 65 weight percent silicon carbide, and from about 8 to about 25 weight percent alumina. A more preferred mixture comprises from about 30 to about 50 weight percent silicon, from about 30 to about 60 weight percent silicon carbide, and from about 10 to about 20 weight percent alumina. It is desirable that each of the silicon, silicon carbide, and alumina be present in the mixture in particulate form. While any suitable particle size can be utilized, in general the particle size of the silicon and alumina will be less than 100 mesh, preferably less than 200 mesh, and more preferably less than or equal to 325 mesh on the Tyler standard screen scale, and the particle size of the silicon carbide will generally be in the range of about 0.5 to about 30 microns, and preferably will be in the range of about 2 to about 20 microns. The components of the mixture are preferably mixed together so as to form an at least substantially uniform mixture.

This first mixture can be applied to the carbon/carbon composite substrate by encasing the entire surface of the substrate with the mixture in a graphite retort. The mixture can be compacted about the substrate in the retort to a suitable compaction, e.g., in the range of about 5 to about 6 tons per square foot. Alternatively, a slurry can be prepared by combining the mixture with a carrier liquid, e.g., water, isopropyl alcohol, and mixtures thereof, and the slurry can be poured into the retort so as to encase the carbon/carbon composite substrate. In either procedure, the retort and its contents can be dried at ambient pressure or vacuum conditions and at room temperature and/or mildly elevated temperatures, e.g., in the range of about 400° F. to about 500° F. for a suitable time period, e.g., in the range of about 10 to about 20 hours. After the initial drying procedure, the retort and its contents are heated in an inert (oxygen free) atmosphere, e.g., argon, to a suitable elevated temperature, e.g., in the range of about 2500° F. to about 3000° F. for a period of time sufficient to form a silicon carbide coating in the desired amount, e.g., a thickness in the range of about 5 to about 50 mils. The retort and its contents are then cooled to less than 600° F. in an inert atmosphere, after which they can be cooled to room temperature in air. Upon cooling to room temperature, the silicon carbide coated carbon/carbon composite substrates are removed from the retort and cleaned. It should be understood that this silicon carbide coating is not a substantial additional thickness of material on the exterior of the carbon/carbon composite substrate, but rather is a change in the composition of the outer layers of the substrate, such that any increase in the thickness of the substrate resulting from the application of the silicon carbide coating is negligible.

A silicon carbide coated carbon/carbon substrate can be boronated by contacting the silicon carbide coated carbon/carbon substrate with a mixture comprising silicon, silicon carbide, and boron, and heat treating the silicon carbide coated substrate having the mixture thereon. The components of the mixture can be present in any suitable amount, but in general the amount of the silicon will be in the range of about 25 to about 40 weight percent of the mixture, the amount of silicon carbide will be in the range of about 50 to about 70 weight percent of the mixture, and the amount of boron will be in the range of about 1 to about 15 weight percent of the mixture. A presently preferred mixture comprises from about 30 to about 35 weight percent silicon, from about 55 to about 65 weight percent silicon carbide, and from about 2 to about 10 weight percent boron. It is desirable that each of the silicon, silicon carbide, and boron be present in the mixture in particulate form. While any suitable particle size can be utilized, in general the particle size of the silicon will be less than 100 mesh, preferably less than 200 mesh, and more preferably less than or equal to 325 mesh on the Tyler standard screen scale. The particle size of the silicon carbide will generally be in the range of about 0.5 to about 30 microns, preferably in the range of about 2 to about 20 microns. The particle size of the boron will generally be in the range of about 0.2 to about 30 microns, and preferably will be in the range of about 0.5 to about 5 microns. The components of the mixture are preferably mixed together so as to form an at least substantially uniform mixture. The composition can also contain a minor amount of magnesium oxide in the boron component, e.g., an amount of magnesium oxide in the range of about 1 to about 15 wt %, and preferably in the range of about 2 to about 8 wt % of the boron component. Magnesium oxide is generally present in that range as an impurity in technical grade particulate boron.

This second mixture can be applied to the silicon carbide coated carbon/carbon composite substrate by encasing the entire surface of the substrate with the second mixture in a graphite retort. The mixture can be compacted about the substrate in the retort to a suitable compaction, e.g., in the range of about 5 to about 6 tons per square foot. Alternatively, a slurry can be prepared by combining the mixture with a carrier liquid, e.g., water, isopropyl alcohol, and mixtures thereof, and the slurry can be poured into the retort so as to encase the silicon carbide coated carbon/carbon composite substrate. In either procedure, the retort and its contents can be dried at ambient or vacuum conditions. After the initial drying procedure, the retort and its contents are heated in an inert (oxygen free) atmosphere, e.g., argon, to a suitable elevated temperature, e.g., in the range of about 2750° F. to about 3250° F. for a period of time sufficient to form a boronated coating in the desired amount, e.g., a thickness in the range of about 5 to about 20 mils. The retort and its contents are then cooled in an inert atmosphere to less than 600° F., after which they can be cooled to room temperature in air. Then the boronated silicon carbide coated carbon/carbon composite substrates are removed from the retort and cleaned. Again, it should be understood that this boronated silicon carbide coating is not a substantial additional thickness of material on the exterior of the carbon/carbon composite substrates, but rather is a change in the composition of the outer layers of the substrates, such that any increase in the thickness of the substrate resulting from the boronation process is substantially negligible.

The boronated silicon coating provides better protection against oxidation than is provided by either the first mixture or the second mixture alone. Optionally, and especially in applications where the substrate will be exposed to cyclic temperatures in which temperatures higher and lower than 2500° F. are encountered, an enhancement material can be applied to the carbon/carbon composite substrate having the boronated silicon carbide primary coating thereon. This enhancement can be accomplished by impregnating the primary coated carbon/carbon composite substrate with tetraethyl orthosilicate. The tetraethyl orthosilicate enhancement coating can be heat cured at a temperature of approximately 3000° F. in order to form a silica coating on the primary coated carbon/carbon composite substrate. Thereafter, a mixture of a liquid alkali silicate and a silicon carbide powder can be applied over the tetraethyl orthosilicate enhancement coating and heat cured, e.g., at a temperature in the range of about 225° F. and 275° F. for a suitable time period, e.g., in the range of about 45 to about 60 minutes. Preferably, the tetraethyl orthosilicate enhancement coating is applied a plurality of times, e.g., five times, and heat cured after each application.

Additional details of a suitable procedure for forming a boronated silicon carbide coating as the primary protective coating on a carbon/carbon composite substrate are set forth in U.S. patent application Ser. No. 638,045, filed Aug. 6, 1984 by Shuford, now U.S. Pat. No. 5,453,324, which in its entirety is incorporated herein by reference.

In accordance with the method of the present invention, a secondary glass ceramic precursor coating material comprising titanium diboride and a silica compound is applied to a surface of the primary coated carbon/carbon composite material. The primary coated carbon/carbon composite material having the secondary coating material thereon is then subjected to heat treating at an elevated temperature which is sufficient to at least form the secondary coating material into a coherent coating which adheres to the primary coated carbon/carbon composite material. The primary coated carbon/carbon material having the coherent coating thereon is then cooled. During the heat treating step or a subsequent exposure to higher temperatures, the coherent coating undergoes at least partial melting so that upon cooling a crystalline glass ceramic coating is formed on the primary coated carbon/carbon composite material.

The secondary coating material comprises from about 35 to about 75 wt % titanium diboride, from about 10 to about 60 wt % of a silica compound, e.g., colloidal silica, and from about 0 to about 50 wt % of an intermetallic compound. The intermetallic compound can be selected from any material which, when reacted with oxygen, can supply one of the primary ions of silicon, titanium or boron, such as silicon carbide, boron carbide and titanium carbide. A preferred secondary coating material comprises from about 35 to about 65 wt % titanium diboride, from about 20 to about 60 wt % of a colloidal silica, and from about 0 to about 35 wt % silicon carbide. A more preferred secondary coating material comprises from about 35 to about 55 wt % titanium diboride, from about 30 to about 50 wt % of a colloidal silica, and from about 15 to about 35 wt % silicon carbide.

The secondary coating material can be applied to the carbon/carbon composite substrate having the primary protective coating thereon in any suitable manner. In one procedure, titanium diboride powder and silicon carbide powder are mixed with the liquid colloidal silica to form a slurry, and the slurry is painted on each boronated silicon carbide coated carbon/carbon substrate specimen and any excess slurry wiped off. The boronated silicon carbide coated carbon/carbon substrate specimens having the glass slurry application thereon can be dried in air at room temperature for a suitable period of time, e.g., 15 minutes to two hours. The coating procedure can be repeated a plurality of additional times for each specimen to provide a glass ceramic precursor material layer of the desired thickness on the boronated silicon carbide coated carbon/carbon substrate specimens. The primary coated carbon/carbon substrate specimens having the layer of glass ceramic precursor material thereon can be subjected to a suitable heat treatment at an elevated temperature which is sufficient to at least form the secondary coating material into a coherent coating which strongly adheres to the primary coated carbon/carbon composite material. The primary coated carbon/carbon material having the coherent coating thereon is then cooled. During the heat treating step or a subsequent exposure to higher temperatures, the coherent coating undergoes at least partial melting so that upon cooling a crystalline glass ceramic coating is formed on the primary coated carbon/carbon composite material. The heat treating can be performed at a temperature in the range of about 1300° F. to about 1500° F. in air to form the coherent coating and then heated to a temperature in the range of about 2200° F. to about 2400° F. in air to melt at least a portion of the coherent coating and thereby form a glass ceramic secondary protective coating upon cooling. Alternatively, the heat treating can be performed at a temperature in the range of about 1300° F. to about 1500° F. in air to form the coherent coating, and then heated to a temperature in the range of about 2200° F. to about 3250° F. in an inert atmosphere, e.g., argon or a vacuum, to melt at least a portion of the coherent coating and thereby form a glass ceramic secondary protective coating upon cooling. If desired, the initial heating to a temperature in the range of about 1300° F. to about 1500° F. can also be performed in an inert atmosphere. In one specific embodiment, the heat treatment comprises heating in air from room temperature to 200° F., holding at 200° F. for one hour, then heating in air from 200° F. to 1300° F., then holding at 1300° F. in air for one hour, and then cooling to room temperature.

EXAMPLE I

Specimens of a carbon/carbon composite having a boronated silicon carbide coating thereon were prepared as follows. Each carbon/carbon composite substrate specimen consisted of AMOCO VCX-11 carbon fabric densified and pyrolyzed five times with Fiberite Carbon-640 phenolic resin.

A silicon carbide coating was applied to the resulting carbon/carbon composite substrate specimens by a two step, pack cementation, conversion process. The carbon/carbon composite substrate specimens were packed in a mixture of 60 wt % silicon carbide (1200 grit), 30 wt % silicon metal powder (20 micron), and 10 wt % tabular aluminum oxide (minus 325 mesh), in a graphite retort. The packed retort was dried at 450° F. for 16 hours, then heated in an inert (oxygen free) argon atmosphere to 2500° F., held at 2500° F. for one hour, then heated in the argon atmosphere to 3000° F., held at 3000° F. for three hours, then cooled in the argon atmosphere to below 600° F., and then cooled in air to room temperature. The carbon/carbon substrate specimens having a silicon carbide coating thereon were unpacked and cleaned. The coating of silicon carbide on the carbon/carbon substrate was 16.68 mg/cm$^2$ of surface area, such that the coated specimens had a weight which was 4.65 wt % greater than the uncoated carbon/carbon substrate specimens.

The cleaned carbon/carbon substrate specimens having the silicon carbide coating thereon were packed in a mixture of 63 wt % silicon carbide (1200 grit), 32 wt % silicon metal powder (20 micron), and 5 wt % boron metal powder (1 micron), in a graphite retort. The packed retort was dried at 450° F. for 16 hours, then heated in an inert (oxygen free) argon atmosphere to 2750° F., held at 2750° F. for one hour, then heated in the argon atmosphere to 3100° F., held at 3100° F. for 2.5 hours, then heated in the argon atmosphere to 3225° F., held at 3225° F. for 1.5 hours, then cooled in the argon atmosphere to below 600° F., and then cooled in air to room temperature. The resulting carbon/carbon substrate specimens having a boronated silicon carbide coating thereon were unpacked and cleaned. The resulting boronated silicon carbide primary coating on the carbon/carbon substrate had a thickness, as measured by microanalysis, in the range of 0.012 to 0.024 inch.

EXAMPLE II

Specimens of a carbon/carbon composite having a boronated silicon carbide coating thereon as a primary protective coating, prepared in EXAMPLE I, were tested, without any secondary coating, by being sequentially placed in two electric furnaces in a static air atmosphere, with one furnace being set at 900° F. and the other furnace being set at 2400° F. Specimens were weighed before testing and after fifteen complete test cycles. Each test cycle was as follows:

| STEP | FURNACE | TEMPERATURE | TIME |
|------|---------|-------------|------|
| 1 | A | 900° F. | 25 minutes |
| 2 | B | 2400° F. | 5 minutes |
| 3 | A | 900° F. | 25 minutes |
| 4 | B | 2400° F. | 5 minutes |
| 5 | A | 900° F. | 25 minutes |
| 6 | B | 2400° F. | 5 minutes |
| 7 | A | 900° F. | 25 minutes |
| 8 | Cool to room temperature. | | |

The foregoing test cycle was repeated for a total of fifteen cycles. The average oxidation weight loss was −0.59 wt % after fifteen cycles.

EXAMPLE III

Specimens of a carbon/carbon composite having a boronated silicon carbide coating thereon as a primary protective coating, prepared in EXAMPLE I, were sealed with a sealant having the following composition:

| COMPONENT | WT. % |
|-----------|-------|
| $Ti_5Si_3$ (−325 mesh) | 24.54 |
| SiC | 10.64 |
| B (1 micron) | 24.67 |
| $SiB_6$ (−325 mesh) | 40.15 |

The silicon carbide was obtained from the Carborundum Company under the trade designation "RA 1200 Green Grit". This secondary coating material was mixed in a 1:1 weight ratio with a K640 phenolic resin to form a glass precursor slurry. Three applications of the glass precursor slurry were painted on each boronated silicon carbide coated carbon/carbon substrate specimen and any excess slurry was wiped off. The boronated silicon carbide coated carbon/carbon substrate specimens having the glass precursor slurry application thereon were dried in air at 160° F. for about 2 hours. The foregoing slurry coating procedure was repeated two additional times for each specimen to provide a glass precursor material layer of the desired thickness on the boronated silicon carbide coated carbon/carbon substrate specimens. The thus coated specimens were then heated in air at 325° F. for one hour and then heated in argon at 1650° F. for one hour to pyrolyze the phenolic resin. The carbon/carbon substrate specimens having the secondary layer thereon were then cooled in an argon atmosphere. The application of the secondary coating resulted in an increase of 3.79 wt %, with the secondary coating having a weight per surface area of 8.56 mg/cm$^2$.

The carbon/carbon substrate specimens having the primary and secondary protective coatings thereon were tested in the test cycle of EXAMPLE II, and had an average oxidation weight loss of −1.45 wt % after fifteen cycles.

The addition of this secondary coating, formed from a titanium/silicon/boron/carbon composition as listed in the foregoing table, resulted in an oxidation weight loss of −1.45 wt %, which is greater than the oxidation weight loss of −0.59 wt % experienced by the samples of EXAMPLE II which had the same carbon/carbon composite and the same primary coating but did not have any second coating. Thus, this application of this particular titanium/silicon/boron/carbon composition can be considered to be detrimental to the oxidation protection of the boronated silicon carbide coated carbon/carbon substrate, or at best ineffective in providing oxidation protection for the boronated silicon carbide coated carbon/carbon substrate.

EXAMPLE IV

Specimens of a carbon/carbon composite having a boronated silicon carbide coating thereon as a primary protective coating, prepared in EXAMPLE I, were sealed with a secondary coating in accordance with the present invention.

A secondary coating material slurry having the following composition:

| COMPONENT | WT. % |
| --- | --- |
| powdered titanium diboride | 35 |
| liquid colloidal silica | 40 |
| powdered silicon carbide | 25 | was painted on each boronated silicon carbide coated carbon/carbon substrate specimen and any excess slurry was wiped off. The boronated silicon carbide coated carbon/carbon substrate specimens having the glass slurry application thereon were dried in air at room temperature for one half hour. The foregoing slurry coating procedure was repeated two additional times for each specimen to provide a glass ceramic precursor material layer of the desired thickness on the boronated silicon carbide coated carbon/carbon substrate specimens. The primary coated carbon/carbon substrate specimens having the layer of glass ceramic precursor material thereon were heated in air from room temperature to 200° F., held at 200° F. for one hour, then heated in air from 200° F. to 1300° F., and then held at 1300° F. for one hour, to provide a coherent secondary coating on the primary coated carbon/carbon substrate specimens. The application of the secondary coating resulted in an increase of 13.17 wt %, with the secondary coating having a weight per surface area of 28.67 mg/cm$^2$.

The carbon/carbon substrate specimens having the primary and secondary protective coatings thereon were tested in the test cycle of EXAMPLE II, and had an oxidation weight loss of −0.21 wt % after fifteen cycles.

The addition of this secondary coating, formed from a titanium/silicon/boron/carbon composition as listed in the foregoing table, resulted in an oxidation weight loss of only −0.21 wt %, which is less than the oxidation weight loss of −0.59 wt % experienced by the samples of EXAMPLE II which had the same carbon/carbon composite and the same primary coating but did not have any second coating, and substantially less than the oxidation weight loss of −1.45 wt % experienced by the samples of EXAMPLE III which had the same carbon/carbon composite and the same primary coating but a different titanium/silicon/boron/carbon composition. Thus, the particular titanium/silicon/boron composition of this EXAMPLE increases the effectiveness of the oxidation protection of the boronated silicon carbide coated carbon/carbon substrate.

EXAMPLE V

Specimens of a carbon/carbon composite having a boronated silicon carbide coating thereon as a primary protective coating, prepared in EXAMPLE I, were sealed with the secondary coating composition of EXAMPLE IV, and tested in the test cycle of EXAMPLE II with the modification that Furnace A was set at 1200° F. instead of 900° F. The cycling between 2400° F. and 1200° F. is considered to a more severe test for the boronated silicon carbide coated carbon/carbon substrate than the cycling between 2400° F. and 900° F. employed in EXAMPLES II through IV. These carbon/carbon composite specimens having a boronated silicon carbide coating and a secondary coating in accordance with the present invention had an oxidation weight loss of −0.06 wt % from the end of the first cycle to the end of the second cycle, while carbon/carbon composite specimens having a boronated silicon carbide coating, as prepared in EXAMPLE I, and no secondary coating had an oxidation weight loss of −1.81 wt % from the end of the first cycle to the end of the second cycle. Thus, the use of a titanium/silicon/boron/carbon composition in accordance with the invention to prepare the secondary coating results in a substantial improvement in the oxidation protection of the boronated silicon carbide coated carbon/carbon composite.

Reasonable variations and modifications are possible within the scope of the foregoing description and the appended claims to the invention.

What is claimed is:

1. A carbon/carbon composite substrate having a primary protective coating and a secondary protective coating applied thereto, said primary protective coating comprising silicon carbide, said primary protective coating providing some protection of said carbon/carbon composite substrate against oxidation during exposure to oxygen at elevated temperatures while developing cracks at said elevated temperatures which in the absence of said secondary protective coating would thereby expose portions of said carbon/carbon composite substrate to oxygen, said secondary protective coating being a coherent glass ceramic formed from a secondary glass ceramic precursor coating material comprising titanium diboride and silica by heat treating said carbon/carbon composite substrate having said primary protective coating and said glass ceramic precursor coating material thereon so that said glass ceramic precursor coating material forms a coherent coating which adheres to the carbon/carbon composite substrate having the primary protective coating thereon.

2. A carbon/carbon composite substrate in accordance with claim 1, wherein said secondary glass ceramic precursor coating material comprises about 35 to about 75 wt % titanium diboride, about 10 to about 60 wt % colloidal silica, and 0 to about 50 wt % of an intermetallic compound, based on the weight of said secondary glass ceramic precursor coating material.

3. A carbon/carbon composite substrate in accordance with claim 1, wherein said intermetallic compound is silicon carbide.

4. A carbon/carbon composite substrate in accordance with claim 1, wherein said secondary glass ceramic precursor coating material comprises about 35 to about 55 wt % titanium diboride, about 20 to about 60 wt % colloidal silica, and 0 to about 35 wt % of an intermetallic compound, based on the weight of said secondary glass ceramic precursor coating material.

5. A carbon/carbon composite substrate in accordance with claim 1, wherein said secondary glass ceramic precursor coating material comprises about 35 to about 65 wt % titanium diboride, about 30 to about 50 wt % colloidal silica, and about 15 to about 35 wt % of an intermetallic compound, based on the weight of said secondary glass ceramic precursor coating material.

6. A carbon/carbon composite substrate in accordance with claim 1, wherein said intermetallic compound is silicon carbide.

7. A carbon/carbon composite substrate in accordance with claim 1, wherein said secondary glass ceramic precursor coating material comprises about 35 wt % titanium diboride, about 25 wt % silicon carbide, and about 40 wt % of colloidal silica, based on the weight of said secondary glass ceramic precursor coating material.

8. A carbon/carbon composite substrate in accordance with claim 1, wherein said primary protective coating comprises silicon carbide.

9. A carbon/carbon composite substrate in accordance with claim 1, wherein said primary protective coating comprises boronated silicon carbide.

10. A carbon/carbon composite substrate in accordance with claim 1, wherein said primary protective coating is formed on said carbon/carbon composite substrate by:

applying a layer of a first coating material to said carbon/carbon composite substrate, said first coating material comprising silicon, silicon carbide, and alumina;

heat treating said carbon/carbon composite substrate having said layer of said first coating material thereon;

applying a layer of a second coating material to said surface of said carbonaceous substrate having the thus heat treated layer of said first coating material thereon, said second coating material comprising silicon, silicon carbide, and boron; and heat treating said carbon/carbon composite substrate having said layer of said second coating material thereon; and wherein said secondary protective coating is formed by:
applying a layer of said secondary glass ceramic precursor coating material to said surface of said carbon/carbon composite substrate having the thus heat treated layer of said second coating material thereon.

11. A carbon/carbon composite substrate in accordance with claim 10, wherein said first coating material comprises from about 20 to about 60 wt % silicon, from about 20 to about 70 wt % silicon carbide, and from about 5 to about 30 wt % alumina, based on the weight of said first coating material;

wherein said second coating material comprises from about 25 to about 40 wt % silicon, from about 50 to about 70 wt % silicon carbide, and from about 1 to about 15 wt % boron, based on the weight of said second coating material; and wherein said secondary glass ceramic precursor coating material comprises from about 35 to about 75 wt % titanium diboride, about 10 to about 60 wt % colloidal silica, and 0 to about 50 wt % of an intermetallic compound, based on the weight of said secondary glass ceramic precursor coating material.

12. A carbon/carbon composite substrate in accordance with claim 10, wherein said first coating material comprises from about 25 to about 55 wt % silicon, from about 25 to about 65 wt % silicon carbide, and from about 8 to about 25 wt % alumina, based on the weight of said first coating material;

wherein said second coating material comprises from about 30 to about 35 wt % silicon, from about 55 to about 65 wt % silicon carbide, and from about 2 to about 10 wt % boron, based on the weight of said second coating material; and wherein said secondary glass ceramic precursor coating material comprises from about 35 to about 65 wt % titanium diboride, about 20 to about 60 wt % colloidal silica, and 0 to about 35 wt % of an intermetallic compound, based on the weight of said secondary glass ceramic precursor coating material.

13. A carbon/carbon composite substrate in accordance with claim 10, wherein said first coating material comprises from about 30 to about 50 wt % silicon, from about 30 to about 60 wt % silicon carbide, and from about 10 to about 20 wt % alumina, based on the weight of said first coating material;

wherein said second coating material comprises from about 30 to about 35 wt % silicon, from about 55 to about 65 wt % silicon carbide, and from about 2 to about 10 wt % boron, based on the weight of said second coating material; and wherein said secondary glass ceramic precursor coating material comprises from about 35 to about 55 wt % titanium diboride, about 30 to about 50 wt % colloidal silica, and about 15 to about 35 wt % of an intermetallic compound, based on the weight of said secondary glass ceramic precursor coating material.

14. A carbon/carbon composite substrate in accordance with claim 13, wherein said intermetallic compound is silicon carbide.

15. A carbon/carbon composite substrate in accordance with claim 1, wherein said carbon/carbon composite substrate comprises a pyrolyized laminate of a plurality of plies of graphite fabric impregnated with resin.

16. A carbon/carbon composite substrate in accordance with claim 10, wherein said carbon/carbon composite substrate, to which said first coating material is applied, comprises a pyrolyized laminate of a plurality of plies of graphite fabric impregnated with resin.

* * * * *